United States Patent [19]

Curry

[11] 4,241,929
[45] Dec. 30, 1980

[54] SKI BOARD WITH IMPROVED FOOT TREADS
[75] Inventor: Paul F. Curry, Raven, Va.
[73] Assignee: Jem Corporation, Marion, Va.
[21] Appl. No.: 970,856
[22] Filed: Dec. 19, 1978
[51] Int. Cl.³ .............................................. B62B 15/00
[52] U.S. Cl. ................................. 280/12 H; 9/310 A; 280/18; 280/813
[58] Field of Search .............. 280/18, 19, 12 H, 12 K, 280/12 KL, 12 R, 606, 607, 609, 601, 813; 9/310 E, 310 B, 310 A, 310 R; 115/6.1; 16/122; 123/185 A, 185 B; 272/75

[56] References Cited
U.S. PATENT DOCUMENTS

| 768,977 | 8/1904 | Clark et al. | 280/12 K |
|---|---|---|---|
| 1,440,565 | 1/1923 | Solbjor | 280/601 |
| 1,559,390 | 10/1925 | Waller | 280/606 |
| 2,181,391 | 11/1939 | Burgeson et al. | 280/18 |
| 2,242,156 | 5/1941 | Wallace | 280/601 |
| 2,264,535 | 12/1941 | Klemm | 280/610 |
| 2,555,430 | 6/1951 | Weeks | 280/480 |
| 2,819,907 | 1/1958 | Thoresen | 280/606 X |
| 2,998,797 | 9/1961 | Risney | 9/310 R X |
| 3,374,003 | 3/1968 | Fulsom | 280/18 |
| 3,378,274 | 4/1968 | Poppen | 280/18 |
| 3,378,275 | 4/1968 | Rockwood et al. | 280/18 |
| 3,437,345 | 4/1969 | Berta | 280/607 |
| 3,537,418 | 11/1970 | Brownson | 115/6.1 |
| 3,900,204 | 8/1975 | Weber | 280/607 |

OTHER PUBLICATIONS
"Burton Boards" brochure and order form.
"Flite Sports" brochure titled "Flite ski*fer".

Primary Examiner—John J. Love
Assistant Examiner—Milton L. Smith
Attorney, Agent, or Firm—Lane, Aitken, Ziems, Kice & Kananen

[57] ABSTRACT

An improved footrest on a surf-type single ski has a plurality of skid-resistant, generally L-shaped members, one positioned in front and the other behind the center line of the ski for receiving the feet of the skier in a readily removable relationship, preferably normal to the transverse axis of the ski. The ski member includes a longitudinal axis, a narrow width, a generally planar intermediate portion, a front portion extending mildly upwardly and inwardly from the intermediate portion to a front end, the intermediate portion and the front portion having a substantially rectangular cross section transverse to the longitudinal axis. The foot receiving L-shaped members include a plurality of recesses along the length thereof for accommodating snow and serving to clean the boot of the user. In an alternative embodiment, a ski of the type described has a metallic plate base member for skiing on sand. An improved handle member may be provided.

14 Claims, 8 Drawing Figures

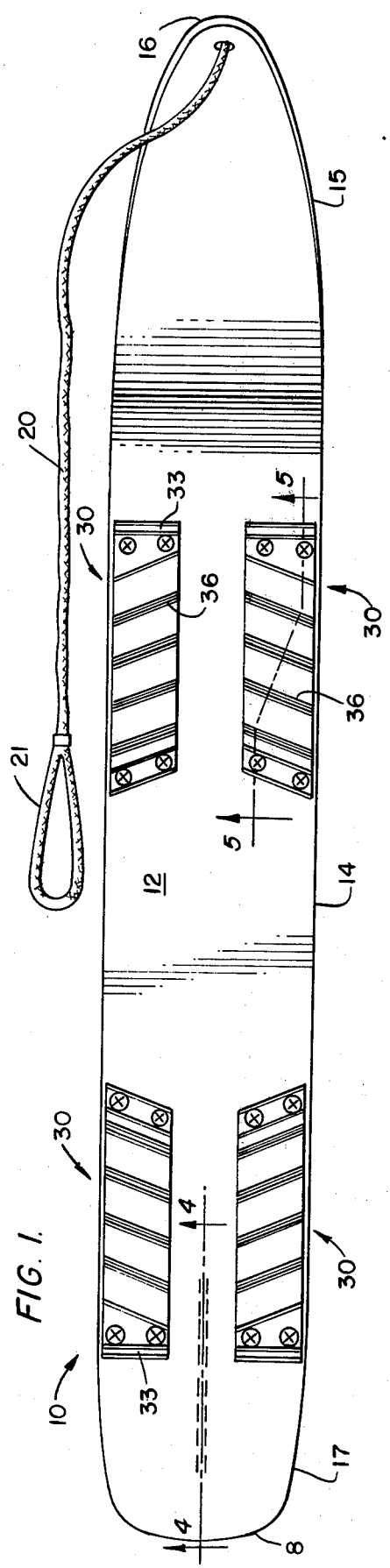
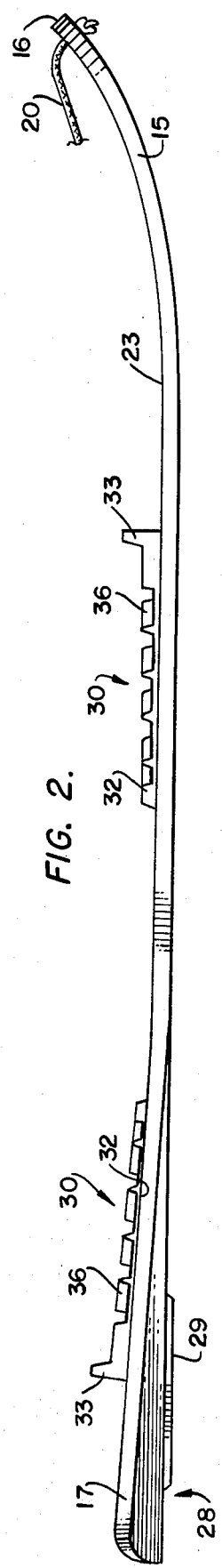
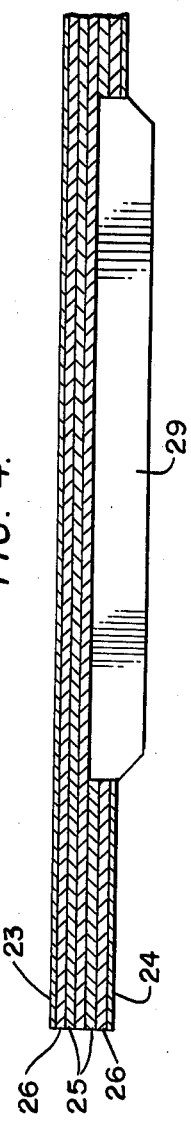
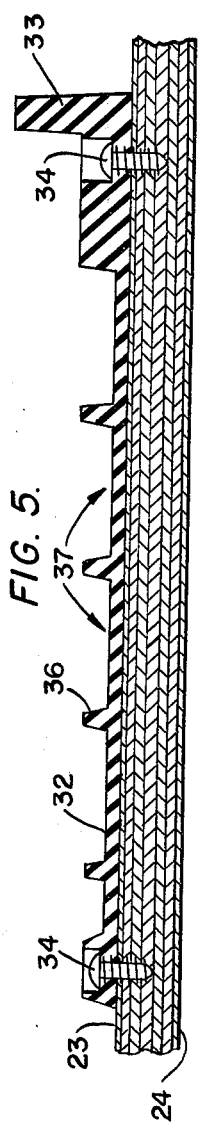
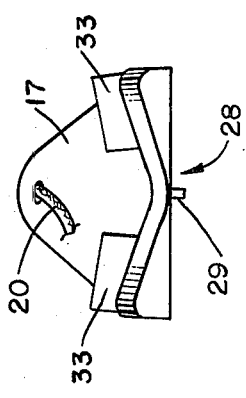

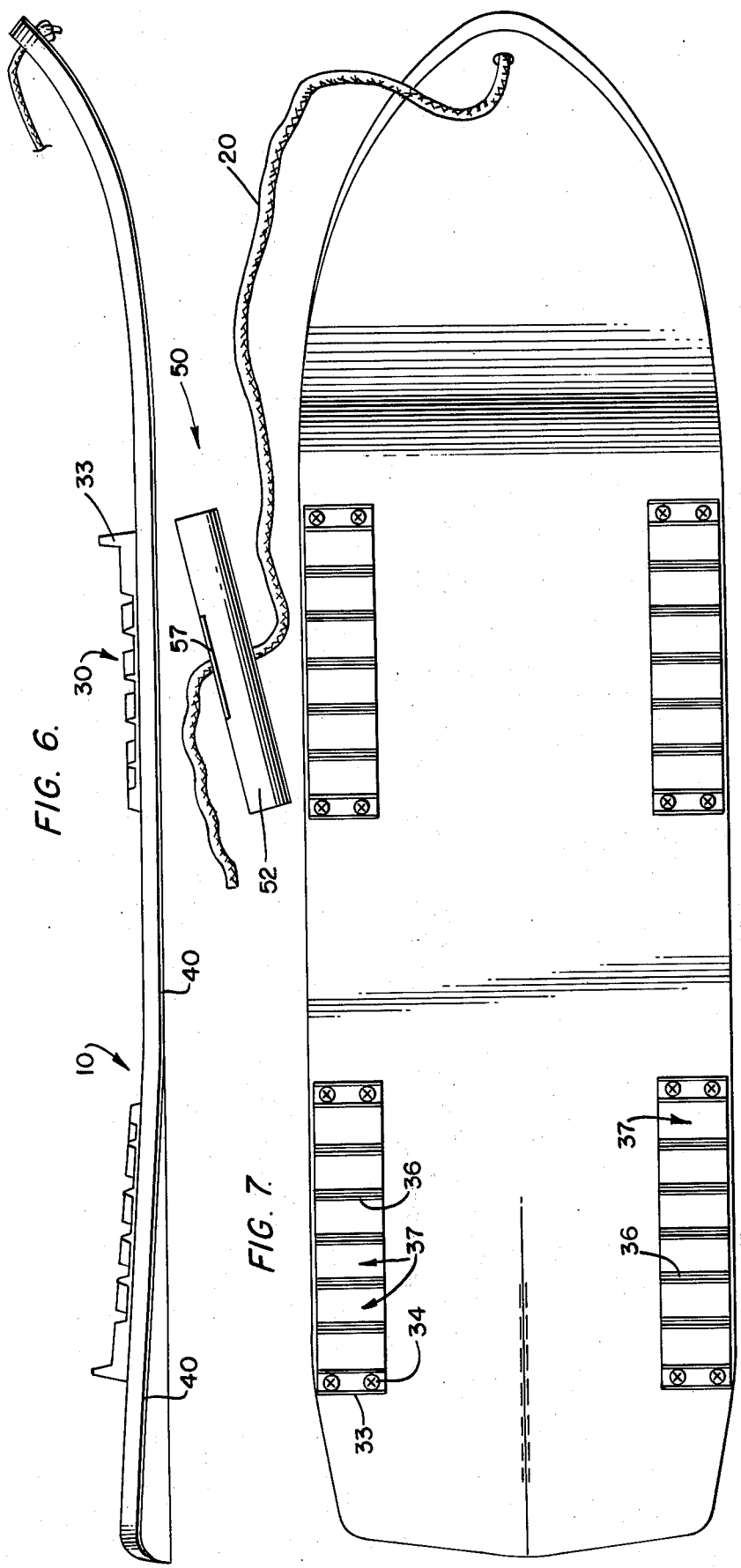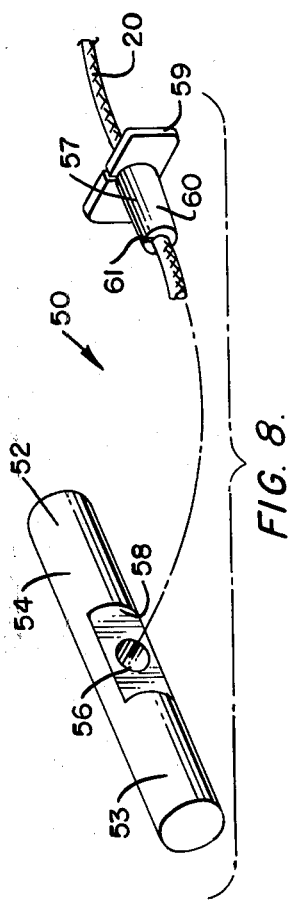

SKI BOARD WITH IMPROVED FOOT TREADS

BACKGROUND OF THE INVENTION

This invention relates to a ski or ski board adapted for use singly by a rider who places his feet on the board and guides the path of the board by tilting the board from side to side in response to a shift of his weight from one side to another. More particularly, this invention relates to an improved foot receiving means for the board comprising at least a pair of skid resistant, generally L-shaped members, preferably arranged for receiving the feet of the user in a position spaced from one another normal to the transverse axis of the ski. Still more particularly, this invention relates to a ski of the type described having a metallic base plate particularly adapting the ski for use on sand. Still more particularly, this invention relates to a ski of the type described having an improved handle member.

U.S. Pat. Nos. 3,378,274 and 3,378,275, both assigned to the assignee of this invention, describe a ski or ski board adapted for use singly, rather than in pairs, by a rider who places his feet on the board one in front of the other and guides the path of the board by tilting the board from side to side in response to a shift in his weight from one side to the other, in a manner similar to that in which surfboards or skateboards are ridden. Preferably, in order to provide the rider with a high degree of stability, the board is provided with a rope or tether having one end attached to the front of the board and a length sufficient for the skier to hold the other end.

Surf-type skis of the type described are defined by a ski member having a longitudinal axis, a relatively narrow width, a generally planar intermediate portion, and a front portion extending mildly upwardly and inwardly from the intermediate portion to a front end. The front portion and the intermediate portion have a substantially rectangular cross section in the direction perpendicular to the longitudinal axis. The rear portion of the ski extends rearwardly from the intermediate portion to a rear end and, as disclosed in the '275 patent, has a cross section transverse to the longitudinal axis of a generally V-shape extending rearwardly from the intermediate portion to the rear end with gradually increasing depth.

It is an overall object of this invention to provide an improved ski of the type described in the aforementioned patents. The '275 patent discloses footrest means comprising a frictional resistant device to prevent skidding of the rider's boot or shoe on the ski. Preferably, such non-skid means take the form of a plurality of rows of inverted U-shaped staples driven into and embedded in the ski with a cross piece of the U in the upper surface of the ski. In addition to resisting slippage, the staples described are self cleaning and if the skier removes his weight from the shoe and slides the shoe longitudinally of the ski, both the shoe and the ski are cleaned from accumulated snow. The '274 patent, on the other hand, discloses antiskid foot treads bonded to the upper surface of the ski in a position so that the skier's boots are situated on the treads and the feet of the skier are manipulated to control the ski. In each embodiment, the feet of the skier have no bindings and therefore control forces must be downward or else transmitted to the ski through lateral friction at the upper surface thereof.

Because control of a ski of the type described is substantially achieved by shifting the weight of the user, binders or locking type footrests are not readily usable on this type of ski for the reason that it is generally desirable to be able to remove or shift the weight of the skier from one foot to the other, which control is not readily achieved by the use of locking type binders or shoe type bindings attached to the ski. On the other hand, foot receiving means on the ski of the type described, particularly when used on ice and snow, have sometimes been susceptible to permitting the foot of the skier to slide fore or aft along the longitudinal axis causing the loss of control of the ski. Thus, it is a problem in providing a ski of the type described to include an adequate friction engaging foot receiving means free from permanent bindings for the foot of the user to permit control of the ski while inhibiting and preventing lateral slippage of the foot of the user along the longitudinal axis of the ski.

In addition, skis of the type described have principally and virtually exclusively been used on snow or ice. Because such skis are generally made of laminated wood, such skis have not had sufficiently long life to use on sand, such as in the dunes of sands adjacent to bodies of water. Thus, a second overall object of the invention is to provide a ski of the type described having a metallic base member secured to the bottom of the ski.

In still another area, such skis have been provided with a control rope. Because of variations in the height of the user, it is desirable to be able to adjust the positioning of a control member secured to the tether or control line which in turn is secured to the front of the ski. Thus, it is still another overall object of this invention to provide an improved handle member which is readily adjustable along the control line to accommodate various heights or preferences of the users.

These and other objects of the invention will become apparent from a review of the accompanying written description of the invention taken in conjunction with the accompanying drawings.

BRIEF SUMMARY OF THE INVENTION

Directed to achieving the aforementioned objects and providing an improved surf-type single ski, this invention relates to an improved foot receiving means. The ski member includes a longitudinal axis, a relatively narrow width, a generally planar intermediate portion, a front portion extending mildly upwardly and inwardly from the intermediate portion to a front end, wherein the front portion and the intermediate portion have a substantially rectangular cross section in a direction transverse to the longitudinal axis. The rear portion extends rearwardly from the intermediate portion of the ski to its rear end and foot receiving means are located on the upper surface of the ski member for receiving at least one foot of the user of the ski.

The improved foot receiving means according to the invention comprises at least a pair of foot skid-resistant, generally L-shaped members, one positioned in front and the other behind the transverse center line of the ski for receiving the feet of the skier in a readily removable relationship and preferably transverse to the longitudinal axis of the ski. The upturned lip of the front L-shaped member is positioned toward the front of the ski while the upturned lip of the rear L-shaped member is positioned toward the rear of the ski. The upturned lips of the L-shaped members thus serve to fixedly position the feet of the skier to prevent fore and aft slippage toward the front of the ski or the rear of the ski respectively. Preferably, the L-shaped members are made from an elastomeric material having a hardness or durometer rating in the range of 85 to 95 and preferably at 90.

In an alternative embodiment the ski is provided with a generally planar flat matallic member secured to the bottom portion of the ski, particularly adapted for permitting the use of the ski on sand. In a conventional wood-type ski, the rear portion has a generally V-shaped cross section which increases in depth in a direction rearwardly from the intermediate portion to the rear end. The alternative embodiment has the same bottom configuration.

A control line or tether is secured to the upturned front portion of the ski and includes a handle member for receiving the hands of the skier to assist in control of the ski during use. The handle member includes a generally round elongated member having spaced apart regions for receiving both hands of the user. The handle member includes a bore for receiving a plug member which has a control line receiving opening therein. In order to adjust the position of the handle member as a unit relative to the control line, the plug member is removed from both the bore and the elongated round member and slid along the rope or control line to the desired position. Insertion of the plug member in the opening in the elongated member fixedly secures the position of the handle member along the line until further adjustment is needed.

BRIEF DESCRIPTION OF THE DRAWINGS

In the drawings:

FIG. 1 is a top plan view of the ski board embodying the principles of the present invention and particularly showing a plurality of elastomeric L-shaped members fixedly secured on the upper surface of the ski;

FIG. 2 is a side elevational view of the board shown in FIG. 1;

FIG. 3 is a rear end elevational view of the board shown in FIGS. 1 and 2;

FIG. 4 is an enlarged fragmentary cross sectional view taken along line 4—4 of FIG. 1;

FIG. 5 is an enlarged fragmentary sectional view of the improved foot tread taken along line 5—5 of FIG. 1;

FIG. 6 is a side elevational view of an alternate embodiment showing a smooth metallic member secured to the bottom of the ski;

FIG. 7 is a top plan view of a ski similar to that shown in FIG. 1 but having a width approximately twice that of FIG. 1 and further showing an alternate foot tread construction; and FIG. 8 is an exploded perspective view of the handle member for adjusting the position of the handle member along the rope or tether.

DETAILED DESCRIPTION OF THE PREFERRED EMBODIMENTS

The improved ski according to the invention is designated generally by the reference numeral 10. The ski 10 includes a ski member or board 12 having a longitudinal axis and a somewhat narrow width. The embodiment shown in FIG. 1 preferably has a length of about 4 feet and a width of about 6 inches.

The single ski member 12 includes a generally planar intermediate portion 14 and a front portion 15 which extends mildly upwardly and inwardly from the intermediate portion to a front end 16 of the ski 10. The front portion and the intermediate portion have a substantially rectangular cross section in a plane transverse to the longitudinal axis. A rear portion 17 extends rearwardly from the intermediate portion 14 to a rear end 18 of the ski. A control line or tether 20 is secured through an opening in the upwardly raised front portion 15 near or at the front end 16. In the embodiment shown in FIG. 1, the control tether includes a loop 21 for receiving a hand or the hands of a user.

As can best be seen in FIGS. 4 and 5, the ski member is defined by a board of a relatively rigid material which may, but need not necessarily, flex during use. In the preferred embodiment as illustrated, the board is comprised of a plurality of laminated plies of uneven number 7 as illustrated in FIGS. 4 and 5, outer and alternate ones of which contain longitudinal woodgrain and intervening ones of which contain grain extending transverse to the length of the ski. The outer plies are designated 23 and 34 for the top surface and bottom surface respectively of the ski. The alternate inner plies 25 are somewhat thicker than the outer plies while the intervening three plies are designated by reference numeral 26 and are of a thickness approximately equal to the thickness of the outer plies. Each ply is of a substantially uniform thickness throughout so that the overall board is of uniform thickness. In manufacture, the plies are positioned adjacent one another with appropriate intervening glue in a pressure mold suitable for bonding the plies and shaping the ski as illustrated and described. By subsequent bonding and shaping, the outer perimeter of the ski may be finished smoothly on the overall outer surface and appropriately covered with a moisture resistant coating.

As best seen in FIGS. 2 and 3, the rear portion 17 has a bottom surface of generally V-shaped cross section generally designated by the reference numeral 28 which increases in depth to the rear end 18. The crest of the V-shaped rear portion falls along the longitudinal axis or center line of the ski 10.

The ski 10 is provided with a guiding keel or blade 29 in the rear portion 17 extending along the central longitudinal axis of the ski and projecting from the bottom surface of the ski for at least a part of the length of the rear portion of the ski.

A plurality of foot receiving members designated generally by the reference numeral 30 are provided on the upper surface 23 of the ski. While at least a pair of foot treads 30 are necessary for reasons to be discussed, in the preferred embodiment, two pairs of the foot treads 30 are shown, one member of each pair being forward of the transverse center line of the ski, the other member of each pair being disposed aft of the transverse center line of the ski.

The foot tread 30 is defined by a generally L-shaped member having an elongated portion 32 and an upraised lip 33. Each foot tread 30 is secured to the ski by a suitable fastening means, such as by screws 34.

The elongated portion 32 of the foot tread 30 includes a plurality of rib members 36 which, for the embodiment shown in FIG. 1, extend obliquely relative to the longitudinal axis of the ski. The ribs on the front pair of the foot treads 30 preferably extend forwardly while the ribs on the rear pair extend rearwardly, relative to the longitudinal axis of the ski to urge the feet of the user fore and aft toward the upturned lips, respectively.

The rib members 36 define a plurality of recesses 37 between adjacent ribs to accommodate an accumulation of snow or ice during use under the foot of the user without significantly affecting his frictional engagement with the foot rest. In addition, the design acts as a plurality of scrapers for removing accumulated snow from the bottom of the sole of the boot or shoe of the user. It is a significant characteristic of the foot treads according to the invention that an upturned lip of a forward L-shaped member is positioned toward the front end 16 of the ski, while an upturned lip of a rear L-shaped member is positioned toward the rear end 18 of the ski. The upturned lips of each L-shaped member serve to fixedly position the feet of the skier to prevent fore and aft slippage between the feet of the skier and the ski.

This is a significant advantage over foot receiving means of the type described in the patents mentioned above for two reasons. First, it permits the user to fixedly position a side of the rearward foot adjacent the upturned lips of the rearward treads and the side of the forward foot adjacent the upturned lips of the forward treads. Once having fixed his feet relative to the ski, the user is free to flex his legs to maximize control of the ski by shifting his weight from side to side relative to the longitudinal axis of the ski as well as fore and aft relative to the transverse center line of the ski, largely dominated by the use of relatively stronger thigh muscles. Because the L-shaped members contain no bindings or foot enclosing features, the user is also free to remove his weight from one foot to the other or even to remove his foot from the ski such as in emergency situations without risk of injury and without any positive manipulative step on the part of the user.

Preferably, the foot treads 30 are made from an elastomeric material having a durometer or hardness rating in the range of 85 to 95 with about 90 being an optimum. A presently preferred composition for the foot tread is made from a polymer available from B. F. Goodrich under the identification F-CARR575 under the formula EPDM. Such a composition is commercially available and contains refined clay, reinforcement agents made of silica pigment made from processed oil, titanium oxide for whitening and coloring, an activator made from stearic acid, and zinc oxide. Wax is used for protection against weathering.

The second significant advantage of the foot tread construction shown is that it preferably causes the skier to place his feet on the ski in a position transverse to the longitudinal axis of the ski in a manner similar to skateboard users. While in the past it has been contemplated to put one foot in front of the other, it has been found that positioning the feet side by side transversely to the longitudinal axis permits greater control of the ski during use.

FIG. 7 illustrates an alternative embodiment of the foot treads in which the rib members 36 are generally parallel to the upraised lips of the L-shaped members and are positioned generally transverse to the longitudinal axis of the ski.

FIG. 7 also is an alternate embodiment of the ski of FIG. 1 which is virtually identical in construction and operation to that shown in FIG. 1 having the alternate foot treads 30 as described. However, the embodiment of FIG. 7 has a length of approximately four feet and a width of about 12 inches and is thus sometimes referred to as a "double wide" ski. Because the planar surface of the embodiment of FIG. 7 is approximately twice that of the embodiment of FIG. 1, a significantly greater stability, particularly for beginners, is provided.

While the embodiments of the aforementioned patents were mentioned primarily for use on snow and ice, such skis have also been found readily utilizable on sandy surfaces, such as those occurring at dunes adjacent bodies of water. However, where the bottom surface 24 is made from wood, the abrasive action of the sandy surface or soil has shortened the life of the ski considerably. Thus, the embodiment of FIG. 6 utilizes a metallic bottom member 40, such as stainless steel, and eliminates the keel member 29 while retaining the generally rearwardly extending V-shaped portion to provide a ski which is readily utilizable in the manner previously described.

The embodiment of FIG. 8 illustrates an improved handle member for receiving and securing a hand or hands of the user to the tether or control line 20. The handle member 50 comprises a generally round elongated gripping member 52 having spaced apart portions 53 and 54 for receiving the hands of the user. Preferably, the gripping member 52 is circular in cross section and sized accordingly. The gripping member 52 defines a bore 56 for receiving an adjustable plug member 57 in a friction engagement.

The plug member 57 includes a generally rectangular plate member 59 secured to a tapered barrel portion 60. The barrel portion 60 frictionally engages the bore 56 in the gripping member 52 while the plate member 59 engages a recess 58 therein. The plug member 57 defines an opening through both the plate member 59 and the barrel portion 60 for receiving the control line 20.

A split ring action by virtue of the elongated recess 61 in the plug member permits a tightening and loosening of the plug 57 adjacent to the tether 20 passing through the opening when the plug member 57 is inserted in the gripping member 52. Since when the plug member is removed from the opening of the control member, it may be slid along the length of the control tether 20, its position relative to the length of the tether is readily adjustable to accommodate various heights. Once the length has been selected, the insertion of the plug member 57 in the opening 56 in the gripping member 52 serves to fixedly secure the plug member 57 at the location along the tether 20.

The manner of use of the ski according to the invention is substantially identical to that described in the '275 patent with the exception of the preferred position of the feet as previously described.

The invention may be embodied in other specific forms without departing from its spirit or essential characteristics. The present embodiments are, therefore, to be considered as illustrative and not restrictive, the scope of the invention being indicated by the claims rather than by the foregoing description, and all changes which come within the meaning and range of the equivalents of the claims are therefore intended to be embraced therein.

What is claimed is:

1. In a surf-type ski of the type defined by a ski member having a longitudinal axis, a somewhat narrow width, a generally planar intermediate portion, a front portion extending mildly upwardly and inwardly from the intermediate portion to the front end, said front portion and said intermediate portion having a substantially rectangular cross section transverse to said longitudinal axis, and a rear portion extending rearwardly from the intermediate portion to a rear end, and feet receiving means on the upper surface of said ski member for receiving at least one foot of the user of the ski, the improvement wherein said foot receiving means comprises at least a pair of foot skid-resistant, generally L-shaped elastomeric members, one positioned in front and the other behind the transverse center line of the ski for receiving the feet of the skier in a readily removable relationship, an upturned lip of the front L-shaped member being positioned toward the front of the ski, an upturned lip of the rear L-shaped member being positioned toward the rear of the ski, the upturned lips of each L-shaped member serving to fixedly position the feet of the skier to prevent fore and aft slippage between the feet of the skier and the ski, said pair of L-shaped members being secured to an upper surface of said ski, wherein each of said generally L-shaped members includes an elongated leg secured to said upturned leg, said elongated leg defining a plurality of spaced ribs along the length thereof and a recess between each of said spaced ribs to accommodate snow and to permit the boot of the user to be cleaned.

2. The ski of claim 1 wherein said elastomeric member has a hardness of 90 plus or minus 5 durometer.

3. The ski as set forth in claim 1 wherein said ribs are positioned substantially parallel to one another and perpendicular to the transverse axis of the ski.

4. The ski as set forth in claim 1 wherein said ribs are positioned substantially parallel to one another and are obliquely oriented relative to the transverse axis of the ski.

5. The ski as set forth in claim 4 wherein the ribs of a forward L-shaped member are obliquely oriented forwardly toward the transverse longitudinal axis of the ski and the ribs of a rearward L-shaped member are obliquely oriented rearwardly toward that axis.

6. The ski as set forth in claim 1 further including a smooth metallic member secured to and substantially coextensive with the lower surface of said ski.

7. The ski as set forth in claim 1 further including a handle member adjustably securable along a tether attached to said ski, said handle member comprising a gripping member for receiving a hand of the user and defining a first bore therein and a plug member defining a second bore therein for receiving said tether therethrough, said plug member being securable within the first bore of said gripping member for securing the tether therein.

8. The ski as set forth in claim 7 wherein said plug member defines an axially oriented, radially extending slot along the length of said plug member so that said plug member is circumferentially compressible.

9. The ski as set forth in claim 8 wherein said plug member includes a plate having a third bore aligned with said second bore, said plate being received in a mating recess on said gripping member.

10. In a surf-type ski of the type defined by a ski member having a longitudinal axis, a somewhat narrow width, a generally planar intermediate portion, a front portion extending mildly upwardly and inwardly from the intermediate portion to a front end, said front portion and said intermediate portion having a substantially rectangular cross section transverse to said longitudinal axis, and a rear portion extending rearwardly from the intermediate portion to a rear end, and feet receiving means on the upper surface of said ski member for receiving at least one foot of a user of the ski and a tether secured to the front portion of said ski, the improvement comprising a handle member adjustably securable along said tether attached to said ski, said handle member comprising:

a gripping member for receiving at least one hand of the user and defining a first bore therein; and a plug member defining a second bore therein for receiving said tether therethrough, at least a portion of said plug member being structurally adapted to be frictionally secured within the first bore of said gripping member upon manual insertion therein and to thereby secure said tether within said second bore when said plug member is so inserted.

11. The ski as set forth in claim 10 wherein said plug member defines an axially oriented, radially extending slot along the length of said plug member so that said plug member is circumferentially compressed when said portion thereof is secured in said first bore to secure said tether in said second bore of said plug member.

12. The ski as set forth in claim 11 wherein said plug member includes a plate having a third bore aligned with said second bore, said plate being received in a mating recess on said gripping member.

13. In a surf-type ski of the type defined by a ski member having a longitudinal axis, a somewhat narrow width, a generally planar intermediate portion, a front portion extending mildly upwardly and inwardly from the intermediate portion to the front end, said front portion and said intermediate portion having a substantially rectangular cross section transverse to said longitudinal axis, and a rear portion extending rearwardly from the intermediate portion to a rear end, and feet receiving means on the upper surface of said ski member for receiving at least one foot of the user of a ski, the improvement wherein said foot receiving means comprises at least a pair of foot skid-resistant, generally L-shaped members, one positioned in front and the other behind the transverse center line of the ski for receiving the feet of the skier in a readily removable relationship, an upturned lip of the front L-shaped member being positioned toward the front of the ski, an upturned lip of the rear L-shaped member being positioned toward the rear of the ski, the upturned lips of each L-shaped member serving to fixedly position the feet of the skier to prevent fore and aft slippage between the feet of the skier and the ski, said pair of L-shaped members being secured to an upper surface of said ski and further including a handle member adjustably securable along a tether attached to said ski, said handle member comprising a gripping member for receiving a hand of the user and defining a first bore therein and a plug member defining a second bore therein for receiving said tether therethrough, said plug member being securable within the first bore of said gripping member for securing the tether therein, wherein said plug member further defines an axially oriented, radially extending slot along the length of said plug member so that said plug member is circumferentially compressible, and said plug member includes a plate having a third bore aligned with said second bore, said plate being received in a mating recess on said gripping member.

14. In a surf-type ski of the type defined by a ski member having a longitudinal axis, a somewhat narrow width, a generally planar intermediate portion, a front portion extending mildly upwardly and inwardly from the intermediate portion to a front end, said front portion and said intermediate portion having a substantially rectangular cross section transverse to said longitudinal axis, and a rear portion extending rearwardly from the intermediate portion to a rear end, and feet receiving means on the upper surface of said ski member for receiving at least one foot of a user of the ski and a tether secured to the front portion of said ski, the improvement comprising a handle member adjustably securable along said tether attached to said ski, said handle member comprising:

a gripping member for receiving at least one hand of the user and defining a first bore therein; and a plug member defining a second bore therein for receiving said tether therethrough, said plug member being structurally adapted to be secured within the first bore of said gripping member upon manual insertion therein and to thereby secure said tether within said second bore when said plug member is so inserted, and further defining an axially oriented, radially extending slot along the length of said plug member so that said plug member is circumferentially compressed, said plug member further including a plate having a third bore aligned with said second bore, said plate being received in a mating recess on said gripping member.

* * * * *